United States Patent [19]

Ito et al.

[11] Patent Number: 4,663,104
[45] Date of Patent: May 5, 1987

[54] METHOD FOR PRODUCING HIGH-STRENGTH INORGANIC CEMENT ARTICLES

[75] Inventors: Kazuo Ito, Tokai; Seiji Terabe, Tokoname; Shozo Harada, Handa, all of Japan

[73] Assignee: Inax Corporation, Japan

[21] Appl. No.: 703,314

[22] Filed: Feb. 20, 1985

[30] Foreign Application Priority Data

Feb. 22, 1984 [JP] Japan .................................. 59-31805

[51] Int. Cl.$^4$ .............................................. C04B 7/02
[52] U.S. Cl. ...................................... 264/60; 264/59; 264/62; 264/63; 264/333
[58] Field of Search ...................... 264/63, 44, 60, 62, 264/59, 333

[56] References Cited

U.S. PATENT DOCUMENTS 4,407,769 10/1983 Harada .................................. 264/60

FOREIGN PATENT DOCUMENTS 56-48464 11/1981 Japan .
449920 1/1939 United Kingdom .................. 264/44
1005437 9/1965 United Kingdom .................. 264/44

*Primary Examiner*—James Derrington
*Attorney, Agent, or Firm*—Lerner, David, Littenberg, Krumholz & Mentlik

[57] ABSTRACT

A novel method for producing a high-strength inorganic cement article is provided. The method comprises kneading under high shearing force a cement mixture containing as essential components hydraulic cement, a hydrophilic organic binder and water, molding the kneaded mixture into an article having a water-to-solid weight ratio of not more than about 0.2, preliminarily hydrating the molded article, firing the preliminarily hydrated article at about 300° to about 1000° C., and then rehydrating the fired article. The resulting cement article has bending strength of not lower than about 200 kgf/sq.cm without fibrous reinforcing materials and has that of not lower than about 350 kgf/sq.cm when reinforced with heat-resistant fiber materials. The cement article can be advantageously glazed in the above mentioned method by applying a glazing agent to a desired surface of the preliminarily hydrated article and then firing the article.

22 Claims, 3 Drawing Figures

METHOD FOR PRODUCING HIGH-STRENGTH INORGANIC CEMENT ARTICLES

BACKGROUND OF THE INVENTION

1. Field of the Invention

This invention relates to a method for producing a high-strength cement article. More particularly, this invention relates to a method for producing a high-strength cement article wherein the porosity and pore size thereof are decreased by the steps of molding by employing specified kneading means with an organic binder, high-temperature firing, and rehydration.

2. Prior Art

Conventional inorganic cement articles are represented by concrete articles, asbestos cement plates, cement roofing tiles, calcium silicate plates, terrazzo blocks, etc. These articles are produced, for example, by adding aggregate, water, and as necessary reinforcing fiber materials, etc. to inorganic cement, mixing them together using a usual mixer, and then either packing the resulting mixture into a mold for molding or molding the mixture to a large mass in a similar manner and cutting the uncured mass to suitable size. Such packing methods include manual packing method and mechanical packing method. Representative molding methods which can be used include pressure molding, vibration molding, pressure-vibration molding, centrifugal molding, extrusion molding, screen molding, etc. In these methods, it is desirable to expel air bubbles and excess water to pack the materials as dense as possible. Thus, such molded articles can be sometimes removed soon after molding operation. Curing of cement is conducted preferably by using water curing, steam curing or autoclave curing to produce cured cement articles. These articles, however, contain a considerable amount of pores and thus are insufficient in strength; they have a bending strength of approximately 60 to 100 kgf/sq.cm which is far lower than the theoretical strength of cement (bending strength of approximately 400 kgf/sq.cm). Even when a reinforcing fiber material is incorporated therein, the strength is approximately 250 kgf/sq.cm. Incidentally, the bending strength is determined in accordance with JIS K7203.

It has been known to increase the strength of a cement article by blending cement materials with an organic synthetic resin, although there remain serious problems such as heat-resistance, flame-resistance, weather-resistance and water-resistance. It is also known that by blending cement materials especially with a water-soluble synthetic resin and curing the resulting blend, there can be obtained a cement product having a bending strength approximately as large as the theoretical value of cement or more. In this case, however, the water resistance or the durability in a wet state is markedly deteriorated. Moreover, there are problems with respect to deterioration due to heat, ultraviolet rays, etc., and to flame resistance. Thus, uses of such cement products are extremely restricted.

The present inventors previously developed a method of making cement articles having good mechanical strength. The method comprises molding a cement concrete mixture, firing the resulting molded article at a high temperature either prior to its hydration curing or after preliminary hydration curing, and then sufficiently hydrating the fired article (cf. U.S. Pat. No. 4,407,769 or Japanese Patent Publication No. 48464/81). The cement article obtained in this method, however, has a bending strength of as low as about 150 kgf/sq.cm or less. Even when reinforcing fiber materials are incorporated therein, the resulting cement article has about 300 kgf/sq.cm or less. Incidentally, it was possible in this method to add to the cement mixture a minimum effective amount of a water-releasing agent or less than about 0.1 part by weight of a paste agent (e.g. CMC and the like) to increase the moldability and the like of the above mentioned concrete molded article. However, it was naturally disadvantageous in view of the strength of the product to add such agent, because such organic substance was burned away to increase voids during the firing step.

SUMMARY OF THE INVENTION

The above mentioned fired and hydrated cement articles are excellent to some extent. The present inventors, however, have continued research noting that the strength of the cement article will be further increased by decreasing the porosity and pore size thereof. As a result, the following procedures have been unexpectedly found out. A dense molded article having decreased porosity and pore size has been obtained by incorporating into cement mortar materials an effective amount of a substantially water-soluble organic binder, kneading the resulting mixture under high shearing force and molding it into a cement article of low water content. Incidentally, large pores which were often present in conventional cement articles have also been eliminated. By firing the resulting molded article preliminarily hydrated at a high temperature, the pore size and porosity thereof increase because of burning out and decomposition of the organic binder, generation of cracks in the article, etc. However, the present inventors have further found that the pore size and porosity of the fired product of this dense molded article are considerably smaller than those of the prior art fired products, they are sufficiently decreased by hydration treatment after the firing because cement hydrate grows in the void portions, and thus an unexpectedly dense structure of the cured cement materials is obtained. Namely, by providing a dense molded article by the combined use of the organic binder and the kneading under high shearing force, there is unexpectedly obtained a high-strength article through the firing and subsequent hydration treatment because the void portions formed by the burning out of the binder during the firing is substantially filled with cement hydrate grown in the hydration treatment.

Accordingly, there is provided according to the present invention a method for producing a high-strength inorganic cement article: which comprises kneading under high shearing force a mixture containing in a weight ratio 100 parts of cement, about 0.5 to about 15 parts of a hydrophilic organic binder, 0 to about 500 parts of aggregate, a suitable amount of water, and as necessary, an effective amount of fibrous reinforcing materials and additives; molding the kneaded mixture into an article having a water-to-solid weight ratio of not higher than about 0.2; preliminarily hydrating the resulting molded article; firing the hydrated molded article at a temperature of about 300° to about 1000° C.; and then sufficiently hydrating the resulting fired article. Incidentally, in the above procedure, a high-strength glazed cement article is advantageously obtained by applying a glazing agent to a desired surface of the preliminarily hydrated article and then firing. In this case, firing is conducted at a temperature not lower than the melting temperature of the glazing agent.

DETAILED DESCRIPTION OF THE INVENTION

Figure 1:
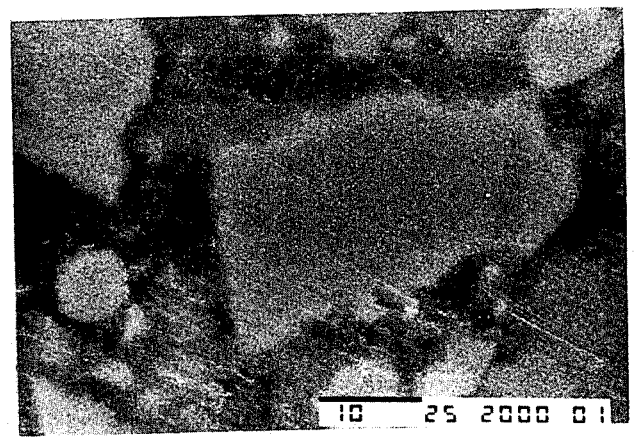
FIG. 1 is a sectional view of a preliminarily hydrated article according to the present invention by means of a scanning electron micrograph (magnification×1,700), which shows the structure of said article and especially the particle structure of the unhydrated cement (corresponding to relatively white parts).

The above mentioned materials are further described below. Quantities therein are by weight unless otherwise specified.

(1) The term "cement" herein means inorganic binding powder materials having a hydraulic property (or water/air hardening property), and is representatively illustrated by portland cement, alumina cement, fly ash cement, blast furnace cement, gypsum slag cement, calcium sulfate cement (e.g. hemihydrate) and mixtures thereof. Usually, portland cement is advantageously used.

(2) The aggregate used herein is usually those having an average particle size of not larger than about 100 mesh, and is used in an amount of 0 to about 500 parts, preferably about 20 to about 400 parts, more preferably about 30 to about 300 parts, and typically about 50 to about 200 parts per 100 parts of cement. The aggregate is exemplified by ceramic chamotte, slag, liparite, volcanic balloon, silicon dust, silica sand, etc. and mixtures thereof. It is generally preferred to use aggregate having a small expansion-contraction coefficient on firing, such as chamotte and the like.

(3) The term "hydrophilic organic binder" herein generally means high-molecular materials which have substantial adhesive property and are either substantially water-soluble materials or water-dispersible fine particle materials. The amount thereof to be used per 100 parts of cement is about 0.5 to about 15 parts, preferably about 0.7 to about 10 parts, more preferably about 1 to about 9 parts, and typically about 2 to 8 parts. The binders are exemplified by cellulose derivatives (e.g. methylcellulose, CMC, etc.) vinyl acetate polymers, partially saponified vinyl acetate polymers, vinyl alcohol polymers, alkylene glycol polymers, acrylamide polymers [e.g. poly(meth)acrylamide, etc.], processed starch materials, etc., and mixtures thereof. Incidentally, it is possible to use the binder in combination with clay minerals.

(4) Water is an essential component to hydraulic cement compositions. It is necessary, however, to make during kneading or molding the weight ratio of water to solid not more than about 0.2 (for example, approximately 0.1 to 0.20), preferably not more than about 0.18 (for example, approximately 0.12 to 0.18). Incidentally, the solid in the water to solid ratio includes cement as well as optional solid components such as aggregate and fibrous reinforcing materials, but excludes the organic binder.

(5) The fibrous reinforcing materials are used as necessary, which is desirable to have substantial heat-resistance against firing. They are used in an effective amount, namely, in an amount ranging from the minimum amount effective for reinforcement to the amount bound by the cement composition. The reinforcing materials include, for example, mineral fibers (or whiskers) such as fibers of potassium titanate, wollastonite, silicon carbide, silicon nitride, carbon, mullite, silica, alumina, asbestos, anticorrosive metal, etc. and mixtures thereof. Glass fibers (especially, alkali-resistant fibers) are also useful when the firing temperature is relatively low. In other words, substantially heat-resistant fiber materials, which are not substantially deteriorated in the firing at not lower than about 300° C., as well as mixtures thereof can be advantageously used in the present invention. As to the form of the fiber materials, short fibers of not longer than about 30 mm in length are generally used for extrusion molding. In the case of other molding methods, the fiber materials of any arbitrary form can be used so far as they do not deteriorate integrated structure of the molded article. For example, monofilaments, rovings and roving cloth which were cut in appropiate sizes can be advantageously used. The above mentioned effective amount will be generally in the range of from about 0.5 to about 20% by weight of the cement used.

(6) Conventional additives for cement products can be optionally used as necessary.

The above mentioned steps are described in detail below.

(a) It is essential for the present invention to effect kneading of the materials under high shearing force. This kneading is not such a simple mixing or blending as is in conventional mixing of cement mortar; it is conducted for more than several minutes applying high shearing force. For example, mixing rolls, Banbury mixers, high-shear kneaders, etc. which have been used for kneading vinyl chloride resins or rubbers can be advantageously utilized. Usually, kneading under the high shearing force is carried out after conventional simple mixing. As a result of the special combination of application of the high shearing force and presence of the above mentioned organic binder, adherence among the particles in the cement composition is increased and the kneading under high shearing force can be effectively conducted to satisfactorily prevent inclusion of air and excess moisture into the particles. Such specified kneading is referred to as "kneading under high shearing force" in the present specification. Thus, by molding the resulting kneaded mixture into a desired shape and preliminarily hydrating the molded article, there can be obtained a dense preliminarily hydrated molded article having a pore size (50% median) of not larger than about 100 millimicrons (preferably, about 10 to about 50 m. microns) and a porosity of not more than about 50% (preferably, about 10 to about 40%). Namely, there is obtained such dense preliminarily hydrated molded article that the void portions therein may be considerably increased during the firing but can be sufficiently supplemented with the growth of cement hydrate by the following rehydration.

(b) As to the molding, all conventional molding methods as mentioned above can be employed. From the viewpoint of the strength of the product, a molding method which accompanies dehydration is generally preferred. Extrusion molding is also useful.

(c) As to the preliminary hydration, all conventional hydrating methods as mentioned above can be used. Usually, it is carried out by allowing the article to stand in a wet air for approximately 1 to 7 days. Incidentally, the preliminary hydration is preferably stopped at the state wherein there still remains a substantial (or considerable) amount of unhydrated cement in the molded article (e.g. incompletely hydrated state wherein the strength due to the hydration has not been fully developed), followed by the next firing step.

(d) The firing is carried out at about 300° to about 1000° C., preferably at about 600° to about 950° C., for several minutes to several hours (e.g. for 3 minutes to 5 hours). Representatively, it is conducted at about 650° to about 900° C. for approximately 10 to 60 minutes. Incidentally, in the present invention, it is necessary to continue firing at least until the organic binder is substantially decomposed. If the firing temperature exceeds about 1000° C., recovery of strength by the final hydration will be lowered.

(e) As for the final hydration hardening, all conventional hydration methods as mentioned above can be used. Incidentally, it is desirable to supplement the moisture which was lost during the firing step by soaking the molded article in water or spraying water thereon, etc. as soon as possible after the firing. In general, practical strength is achieved by the hydration curing for a few days. The structures of the molded article during each of the preliminary hydration, firing and rehydration steps are explained below in detail by way of the working examples and attached drawings.

(f) Utilizing the firing and hydration steps according to the present invention, a cement article can be advantageously glazed. Namely, after applying an ordinary glazing agent onto a desired surface of a preliminarily hydrated molded cement article, the article is fired to fusion-bond the glazing agent and then hydrated soon thereafter. Thus, a glazed cement article is obtained wherein decrease in strength due to carbonation is prevented, surface hardness as well as durabilities such as chemical-resistance, water-resistance and weather-resistance, etc. are increased, and, moreover, decorative effects such as design patterns are also provided thereon. The glazing agent is represented, for example, by a composition comprising by weight 5 parts of frit, 80 parts of glass powder, 5 parts of Gairome clay (kaolin clay containing quartz particles), 5 parts of feldspar, and 40 parts of water. As necessary, it is possible to dry under heating the preliminarily hydrated molded article, apply the glazing agent and then treat similarly as above.

The present invention is further explained by way of the following examples. The quantities in the examples are by weight unless otherwise specified. Incidentally, it should be understood that these examples are merely illustrative and that the modification and change can be made within the technical spirits of the invention.

EXAMPLE 1

Ordinary portland cement 100 parts was mixed with 200 parts of silica stone of not larger than 200 mesh in particle size and 4 parts of methylcellulose (Shinetsu hi-metholose 15000) in an omnimixer in a dry state for 5 minutes. Then, 54 parts of water was added thereto and mixing was conducted for additional 5 minutes. The resulting mixture was kneaded under high shearing force by means of mixing rolls for about 5 minutes to give a cement blend having a water-to-solid ratio of 0.18. The blend was molded between rollers into a board of 300 mm in width, 500 mm in length and 3 mm in thickness. The resulting cement board was allowed to stand in a wet air for one week to preliminarily hydrate it, dried in an air bath at 100° C. for 8 hours to remove free moisture therefrom, fired in a rapid-firing furnace at 400° C. for 120 minutes, and soon thereafter, immersed in water. After one day, the board was cured in an autoclave under 10 kgf/sq.cm for 8 hours to give a cement article having a bending strength of 300 kgf/sq.cm.

EXAMPLE 2

Ordinary portland cement 100 parts was mixed with 100 parts of porcelain chamotte having a particle size of not larger than 100 mesh, 2 parts of methylcellulose, and 2 parts of potassium titanate fiber (about 0.2 mm in mean length) by an omnimixer in a dry state for 5 minutes. The mixture was then mixed with 40 parts of water for additional 5 minutes. The resulting mixture was kneaded under high shearing force by means of mixing rolls for about 5 minutes to give a cement blend having a water to solid ratio of 0.20. The resulting blend was molded into a board of 300 mm (width)×300 mm (length)×2.5 mm (thickness) by means of a press. The board was allowed to stand in a wet air for one week. The preliminarily hydrated board was sprayed thereon with a glazing agent, which had been prepared by finely milling in a wet mill a formulation consisting of 5 parts of frit, 80 parts of glass powder, 5 parts of Gairome clay, and 5 parts of feldspar, in an amount of 500 g (dry weight of the glazing agent)/sq.m. The resulting board was fired in a rapid-firing furnace at 800° C. for 30 minutes, and soon thereafter immersed in water for one day, and then steam-cured under the conditions of 40° C. and 100% humidity for 12 hours to give a glazed cement article.

The glazed surface thereof was immersed in a 10% HCl solution or a 10% NaCl solution for 72 hours, but no change was observed. The weather-resistance of the article was good; namely, no change was observed in the article after 1000 hours in a weatherometer. The bending strength of this glazed cement article was 400 kgf/sq.cm.

EXAMPLE 3

Ordinary portland cement (100 parts) and methyl cellulose (2 parts) were mixed by an omnimixer in a dry state for 5 minutes, incorporated with 15 parts of water and then mixed for additional 5 minutes. The resulting blend was kneaded under high shearing force by means of mixing rolls for about 5 minutes to give a cement blend having a water to solid ratio of 0.15. The resulting blend was molded into a cement board of 300 mm (width)×300 mm (length)×3 mm (thickness) by a press. The board was allowed to stand in a wet air for one week to preliminarily hydrate it, dried in an air-bath at 100° C. for 8 hours to remove free moisture, fired in a rapid-firing furnace at 800° C. for 10 minutes, and, soon thereafter, immersed in water. One day after, the board was taken out of the water and then subjected to steam curing under the conditions of 70° C. and 100% humidity for 8 hours. As a result, there was obtained a cement article having a bending strength of 270 kgf/sq.cm. The article, 7 days after rehydration, had a pore size (50% median) of about 30 millimicrons.

EXAMPLE 4

Figure 3:
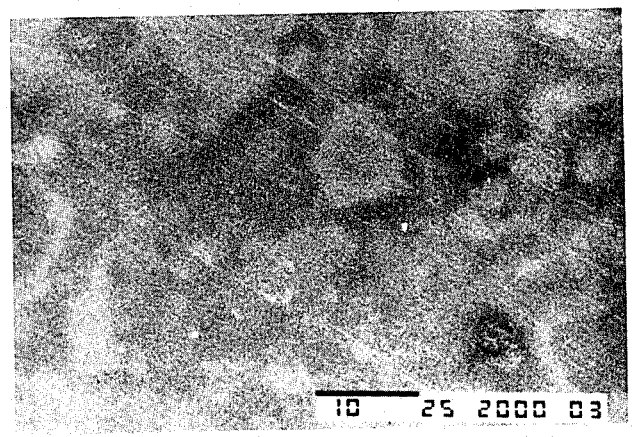
FIG. 3 is a sectional view of the rehydrated molded article according to the present invention by means of a scanning electron micrograph (magnification×1,700), which shows the structure of the rehydrated article, particularly the particle structure of the unhydrated cement (corresponding to relatively white parts).

In order to clearly show, by means of photographic drawings, the structural characteristics of the preliminarily hydrated molded article, the fired article and the rehydrated article according to the present invention, the procedure of Example 3 was repeated except that firing was conducted at 850° C. for 30 minutes. In the attached drawings are shown scanning electron micrographs (magnification×1,700) of the sections of the preliminarily hydrated molded article, fired article, and the article which has been allowed to stand at room temperature for 7 days after rehydration. Incidentally, it is noted that the micrographs in FIGS. 1 and 3 are somewhat hazed. This is because cement hydrate exists on the interfaces of the unhydrated cement particles. In this example, neither aggregate nor fiber material is included in the cement article so that the structural change may be clearly shown. Also in the case where such reinforcing materials exist in the article, burning out of an organic substance, generation of cracks, growth of cement hydrate and the like do not make a large difference.

In the attached drawings, FIG. 1 is a photographic sectional drawing of the preliminarily hydrated molded cement particles that the hydration of cement is increased.

Figure 2:
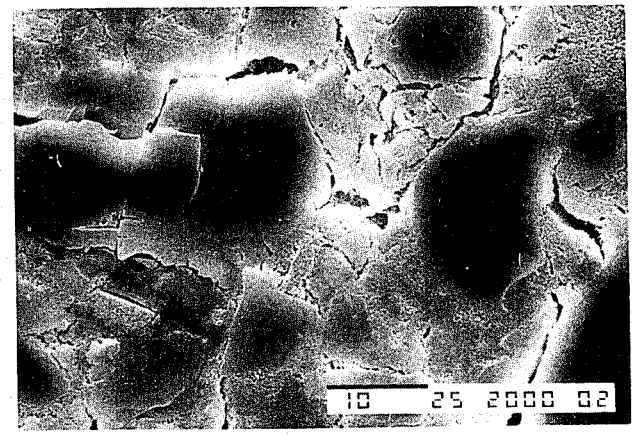
FIG. 2 is a sectional view of the fired molded article according to the present invention by means of a scanning electron micrograph (magnification×1,700), which shows the structure of the fired article and especially the particle structure of the unhydrated cement (corresponding to relatively black parts).

Namely, in the electron micrographic drawings in FIGS. 1 through 3, the particle structures of the unhydrated cement in the preliminarily hydrated molded article and of fine particles arround the unhydrated cement are remarkably changed by the firing step and the following rehydration step. Such change illustrates one of the characteristics of the present invention. This is satisfactorily explained with reference to the change in particle structures of the unhydrated cement in the molded article.

EXAMPLE 5

The procedure of Example 2 was repeated except that 2 parts by weight of commercially available carbon fiber (mean length: about 10 mm) was used instead of the potassium titanate fiber. The resulting article had a bending strength of 455 kgf/sq.cm. Incidentally, the bending strength in each of the above examples was measured according to JIS (Japanese Industrial Standards) K7203.

Incidentally, the preliminarily hydrated molded article, fired article and rehydrated article according to the present invention representatively have porosities and pore sizes (in accordance with Archimedes' method and a mercury porosimeter method) in the following ranges.

| molded articles | porosity (%) | pore size (50% median) (millimicrons) |
|---|---|---|
| (i) preliminarily hydrated molded article | not more than about 45 (preferably about 40 to about 10 or less) | not larger than about 100 (preferably about 50 to about 10 or less) |
| (ii) fired article (850° C., 30 min.) | not more than about 50 | about 600 to about 300 or less |
| (iii) molded article, rehydrated and further cured at room temperature | not more than about 45 (preferably about 40 to about 10 or less) | not larger than about 300 (preferably about 200 to 10 or less) | article. In FIG. 1, relatively white particles are unhydrated cement particles, while relatively black parts correspond to cement hydrate and the organic binder. The cement hydrate and the organic binder are densely packed among the unhydrated cement particles.

FIG. 2 is a photographic sectional drawing of the fired molded article. Relatively black parts correspond to the unhydrated cement particles, in which cracks are generated. No organic binder is observed since it is burned out. Relatively white parts correspond mainly to fired cement hydrate parts and large cracks are observed at the boundary between those hydrate parts and the unhydrated cement particles. Cracks are generated at the boundary faces between the unhydrated cement and the cement hydrate, as well as in the unhydrated cement. Porous parts are also observed in the places where cement hydrate and organic binder were present before firing.

FIG. 3 is a photographic sectional drawing of the molded article which was rehydrated after firing. In FIG. 3, relatively white parts are unhydrated cement particles, the particle size of which is recognized to be reduced when compared with those in FIG. 1. Relatively black parts correspond to cement hydrate. The structure is composed of cement hydrate densely packed among the unhydrated particles. It can be seen from the decrease in particle size of the unhydrated Thus, according to the present invention, a mixture of cement, an organic binder, water and preferably aggregate is kneaded under high shearing force by means of mixing rolls or the like, and then molded into a dense article having small porosity. Through drying and firing, free water in the preliminarily hydrated article and crystal water in the hydrate are removed and the organic substance is burned out to make the article porous. By supplying water to this porous fired article, the cement hydrate which has been made anhydrous by firing is restored to its original state. Moreover, originally unhydrated cement particles contained in the preliminarily hydrated article undergo, in the rehydration step, dissolution of cement particles as well as separation of gel and crystals of cement hydrate. Thus, the inside of the porous article is substantially packed with the cement hydrate. When this rehydrated article is compared with the preliminarily hydrated article prior to firing, it is considered that the volume which has been occupied by the organic substance at the preliminarily hydrated state (for example, 10 to 20% by volume ratio, 5 to 10% by weight ratio) is replaced with the gel and crystals of cement hydrate to give a cured cement hydrate article having a dense structure and consisting of inorganic substances alone. Since there is no large pores in this cement article and the structure thereof is dense, the strength is greatly increased. For example, a bending strength of about 300 kgf/sq.cm will be achieved. By adding a fibrous reinforcing material, a bending strength of about 400 kgf/sq.cm or more will be obtained. Since the present cement article is completely inorganic, it has longtime stable endurance.

Accordingly, the bending strength (in accordance with JIS K7203) of the present cement article without reinforcement with fiber materials is about 200 kgf/sq.cm or more and preferably about 250 kgf/sq.cm or more. Moreover, the bending strength is about 350 kgf/sq.cm or more and preferably about 370 kgf/sq.cm or more, when reinforced with fiber materials. As a result, it is apparent that Charpy impact strength is also increased in addition to the increase in bending strength.

What is claimed is:

1. A method for producing a high-strength inorganic cement article, which comprises kneading under high shearing force a cement mixture containing by weight as essential components 100 parts of hydraulic cement, about 0.5 to about 15 parts of a hydrophilic, substantially adhesive organic binder and water, said binder and said high shearing force being effective to promote adherence among cement mixture particles during said kneading step to thereby minimize inclusion of air and excess moisture in the kneaded mixture; molding the resulted kneaded mixture to an article having a water-to-solid weight ratio of not more than about 0.2; preliminarily hydrating the molded article; firing the resulting hydrated article at a temperature of about 300° to about 1000° C.; and then hydrating the fired article.

2. The method according to claim 1, in which the cement mixture contains not more than about 500 parts by weight of aggregate per 100 parts by weight of the cement.

3. The method according to claim 2, in which the aggregate used has a small thermal expansion coefficient.

4. The method according to claim 1, in which the cement mixture contains an effective amount of a substantially heat-resistant fibrous reinforcing material.

5. The method according to claim 1, in which the cement article has a bending strength of not lower than about 200 kgf/sq.cm.

6. The method according to claim 1, in which the cement mixture kneaded under high shearing force is molded into an article having a water-to-solid weight ratio of not more than about 0.18.

7. The method according to claim 1, in which the preliminarily hydrated article has a pore size (50% median) of not larger than about 100 millimicrons and a porosity of not more than about 50%.

8. The method according to claim 1, in which the cement article has a pore size (50% median) of not larger than about 300 millimicrons and a porosity of not more than about 45%.

9. The method according to claim 1, in which a glazing agent is applied onto the desired surface of the preliminarily hydrated article, the resulting article is fired at a temperature of from the melting temperature of the glazing agent to about 1000° C., and the fired article is then hydrated.

10. The method according to claim 2, in which the cement article has a bending strength of not lower than about 200 kgf/sq.cm.

11. The method according to claim 2, in which the cement mixture kneaded under high shearing force is molded into an article having a water-to-solid weight ratio of not more than about 0.18.

12. The method according to claim 2, in which the preliminarily hydrated article has a pore size (50% median) of not larger than about 100 millimicrons and a porosity of not more than about 50%.

13. The method according to claim 2, in which the cement article has a pore size (50% median) of not larger than about 300 millimicrons and a porosity of not more than about 45%.

14. The method according to claim 2, in which a glazing agent is applied onto the desired surface of the preliminarily hydrated article, the resulting article is fired at a temperature of from the melting temperature of the glazing agent to about 1000° C., and the fired article is then hydrated.

15. The method according to claim 4, in which the cement mixture contains not more than about 500 parts by weight of aggregate per 100 parts by weight of the cement.

16. The method according to claim 4, in which the cement article has a bending strength of not lower than about 350 kgf/sq.cm.

17. The method according to claim 4, in which the cement mixture kneaded under high shearing force is molded into an article having a water-to-solid weight ratio of not more than about 0.18.

18. The method according to claim 4, in which the preliminarily hydrated article has a pore size (50% median) of not larger than about 100 millimicrons and a porosity of not more than about 50%.

19. The method according to claim 4, in which the cement article has a pore size (50% median) of not larger than about 300 millimicrons and a porosity of not more than about 45%.

20. The method according to claim 4, in which a glazing agent is applied onto the desired surface of the preliminarily hydrated article, the resulting article is fired at a temperature of from the melting temperature of the glazing agent to about 1000° C., and the fired article is then hydrated.

21. A method for producing a high-strength inorganic cement article, which comprises kneading under high shearing force a cement mixture containing by weight as essential components 100 parts of hydraulic cement, about 0.5 to about 15 parts of a hydrophilic, substantially adhesive organic binder and water, said binder being effective to promote adherence among cement mixture particles during said step of kneading under high shearing force; molding the resulting kneaded mixture to an article having a water-to-solid weight ratio of not more than about 0.2; preliminarily hydrating the molded article; firing the resulting hydrated article at a temperature of about 300° to about 1000° C.; and then hydrating the fired article, said high shearing forces and said binder being effective to minimize inclusion of air and excess water in said mixture during said kneading step to an extent sufficient to impact a pore size (50% median) of not larger than about 100 millimicrons and a porosity of not more than about 50% to the preliminary hydrated molded article formed in said molding and preliminarily hydrating steps.

22. A method as claimed in claim 21 wherein the bending strength of the fired, hydrated article is not lower than about 200 Kgf/cm$^2$.

* * * * *